United States Patent Office 3,420,932
Patented Jan. 7, 1969

3,420,932
METHODS OF MAKING ALCOHOL SOLUBLE COMPLEXES OF ALUMINUM AND PREPARATIONS EMPLOYING THE COMPLEXES
John L. Jones, North Plainfield, and Andrew M. Rubino, New Providence, N.J., assignors to Armour Pharmaceutical Company, Chicago, Ill., a corporation of Delaware
No Drawing. Continuation-in-part of application Ser. No. 472,684, July 16, 1965. This application Dec. 20, 1966, Ser. No. 603,133
U.S. Cl. 424—47                                                                 16 Claims
Int. Cl. A61k 7/00; C07f 5/06

ABSTRACT OF THE DISCLOSURE

An inorganic-organic coordinated complex of aluminum derived by mixing an aqueous solution of an aluminum-containing material from the class consisting of aluminum basic chloride and aluminum basic bromide, with a polyhydroxy compound having at least two carbon atoms, each of which is linked to a hydroxy group, heating said mixture to a temperature of between 80° and 110° C., and spray drying said mixture to obtain a product having a water content of about 1.0 to 10 weight percent (Karl Fischer analysis). Also an aerosol formulation comprising a non-aqueous solvent, an aerosol propellant, and at least 5% by weight of the aforesaid complex.

This application is a continuation-in-part of application Ser. No. 472,684 filed July 16, 1965 and now abandoned.

The present invention relates generally to novel aluminum inorganic-organic complexes which have an unexpectedly high degree of aluminum ionicity and significant solubility in non-aqueous media, to methods of making such complexes, and to methods of and preparations employing such complexes in the formulation of novel and effective non-aqueous compositions which are useful as antiperspirants.

Certain background information is well to note in order to more fully appreciate and understand the present invention. For example, it is well to understand that the enhanced solubility in non-aqueous media which, as will appear, is exhibited by the complexes of this invention, is extremely significant since it is accomplished without losing the ionicity of the aluminum coordinated therein.

Inextricably bound to the concept of antiperspirancy, or astringency, as it is sometimes characterized, is the requirement that an aluminum compound, to be effective, must retain the ionic character (herein denominated "ionicity") of the aluminum. This is because it is the ionic form of aluminum which is effective as an antiperspirant, not the covalent form. Thus the many known alcohol-soluble aluminum compounds are irrelevant to the present disclosure because without exception (and here we refer to significant, not trace solubility), they are compounds in which aluminum exists in its covalent form and therefore are relatively useless as antiperspirants.

Since it is apparent that important consideration motivating our present efforts is the ultimate hope of creating an effective antiperspirant, some attention should be directed to the development of the art of antiperspirancy.

Among the many antiperspirants described as having the property of retarding or inhibiting the flow of perspiration (to be distinguished clearly from the so-called "deodorant" which does not affect the flow of perspiration but instead masks or only neutralizes its odor), the most effective have been considered heretofore to be those containing aluminum salts of strong inorganic acids such as hydrochloric, sulfuric, sulfamic, etc. Cosmetic preparations containing salts of these strong acids, however, are very seriously disadvantaged because they burn human skin and they corrode and weaken the fabric in garments with which they come into contact, both during and after application to body areas. Indeed, the corrosive action of such salts is so severe that considerable research effort has been directed through the years towards minimizing such effects while at the same time attempting to maintain a major portion if not all of the antiperspirancy properties of these aluminum compounds.

To put this in terms of product characteristics, the product must contain a sufficient amount of aluminum in ionic form to be effective as an antiperspirant while having a pH which is sufficiently high (at least above about 3.0) to substantially eliminate the corrosion of skin and clothing.

This effort has further been combined with the continuing desire to present the antiperspirant product to the consumer in a convenient, as well as effective, form. This later consideration has seen the advent of creams, spray bottles, saturated pads and soap gel sticks, all of which presented both advantages and disadvantages to the trade.

The most recently developed consumer applicator and, possibly, the most convenient, has not heretofore been adaptable for true antiperspirants because of many problems which are inherent in prior antiperspirant formulations. This applicator, the so-called "aerosol dispenser," has been successfully adapted to the deodorant field by the packaging of certain bactericides (e.g., zinc sulfocarbolate and hexachlorophene) in alcohol with a suitable propellant. This type of product however does not materially affect the exudation of perspiration by the body. Rather these products attack the bacteria in the exudate which bacteria, if left unchallenged, would otherwise create an offensive odor by their metabolic processes. Such products, even when some slight antiperspirant effect is noted, can be prepared in solutions of only about 1 to 3% potency whereas it is generally accepted that no composition is effective as an antiperspirant at less than a minimum concentration of from 10 to 20 percent of the active ingredient.

If the aerosol dispenser is to be adapted to the antiperspirant field, a whole new set of problems must be solved and a list of goals established. (See: Cosmetics, Science and Technology, Chap. XXXVI. Aerosol Cosmetics, Interscience Publishers, Inc., N.Y., pages 826 et seq.) For instance, an antiperspirant composition must be found which is not only effective to inhibit perspiration in a safe and non-corrosive manner, it must also be compatible with those compounds employed to propel aerosol sprays. Furthermore, such a composition should contain a minimal water content so as to eliminate the extreme corrosion induced by aqueous media to the metal valves and containers and the product contamination resulting therefrom. Furthermore, such compositions must be capable of being dissolved in non-aqueous media in concentrations of at least 10%.

Of course, one obvious alternative would be to package such excellent antiperspirants as aluminum chlorohydroxide (water soluble, alcohol insoluble) in glass or plastic lined containers and thereby circumvent the corrosion problem. This has been tried and it was learned that the costs of manufacturing and loading such containers provide a final product which, irrespective of its effectiveness, cannot compete in the market place. Thus, still another overriding consideration appears which, in the last resort, may prove to be a controlling factor since, irrespective of all intellectual considerations regarding product perfection, one still must be capable of bringing a product to market at a price the public will be willing to pay. Without meeting this last objective, all other considerations evolve into mere academic nicety.

In an attempt to solve the myriad of problems confronting us we have chosen to return to the efforts of the art to develop aluminum containing compositions which are effective as antiperspirants but are substantially non-corrosive to the user's skin or wearing apparel. We have chosen this route because even the generally accepted "best" antiperspirant available, namely, aluminum chlorohydroxide (sold under the trademark "Chlorhydrol"), contains about 20% free and bound water, as determined by the Karl Fischer Analysis, is insoluble in non-aqueous media, e.g., 95% alcohol, 100% propylene glycol, and 100% glycerine and, indeed, requires water or other water-containing solvents to obtain a soluble state.

We start, therefore, in an art in which there is no truly effective and non-corrosive antiperspirant known which does not require aqueous media for dissolution. Our goal is to develop new and novel antiperspirant compounds and formulations which are capable of approaching the high antiperspirancy heretofore generally attributed to the mineral acid salts of aluminum, which eliminate substantially all of the body and clothing corrosion which accompanied the use of such mineral acid salts, which, simultaneously, are compatible with the available aerosol propellants, such as the halogenated (fluoro chloro) hydrocarbons, which can be packaged and stored under pressure in inexpensive metal containers with minimization of rust and explosion difficulties, and which contain an available active antiperspirant in concentrations of at least 7%.[1]

The present invention is predicated upon our discovery of new complexes (coordination compounds) of aluminum which maintain the ionicity of the aluminum and thereby are highly effective as antiperspirants (astringency being the key characteristic), which have a pH in excess of about 3.0, which are compatible with halogenated hydrocarbon propellants, and which, most importantly, are soluble in non-aqueous media to provide effective concentrations of 7% or greater.[1] We have further discovered how to make these complexes in an easy and economical fashion and to formulate effective liquid antiperspirant compositions from them which compositions are highly suited for use, inter alia, in the aerosal dispensers.

Accordingly, a prime object of the present invention is to provide new coordination compounds (complexes) of aluminum; which compounds are readily soluble in non-aqueous media; which compounds are compatible with conventional aerosol dispenser propellants, such as the chlorofluoro hydrocarbons; which compounds exhibit effective and safe antisperspirant action; and which compounds can be prepared in such a manner as to permit the presentation of a competitive product in the market-place.

[1] When present in aerosol, the concentration can go as low as 5% since the average formulation contains 40–60% propellents which are dissipated immediately on application, making a 5% formulation equal to 10%.

Another object of the present invention is to provide new complexes of aluminum which have effective antiperspirant properties and can be used in the presence of metal parts while remaining substantially non-corrosive to skin and fabric clothing.

A further object of the present invention is to provide new complexes of aluminum which can be dissolved in effective concentrations in non-aqueous volatile solvents while maintaining effective ionicity.

Still another object of the present invention is to provide a composition which can be dispensed in a non-aqueous carrier as a rapidly drying spray which dries on the skin to regulate and control the exudation of perspiration from the skin contiguous thereto.

A still further object of the present invention is to provide alcohol soluble complexes of aluminum which are useful to form a liquid antiperspirant formulation in which the ionicity of the aluminum is maintained.

Another object of the present invention is to provide an antiperspirant formulation which avoids the corrosive effect heretofore characteristic of the mineral acid salts of aluminum and yet obtain an antiperspirant action of comparable effect.

It is another object of the present invention to provide antiperspirant compositions which can be readily administered from and by aerosol dispensers which are highly effective in inhibiting or retarding the exudation of perspiration from the human body and yet are non-irritating to human skin and non-corrosive to clothing fabrics.

Still another object of the present invention is to provide new and useful coordination compounds of aluminum which are characterized by ionicity of the aluminum and which obtain, in nonaqeuous solvents, a solubility of at least about 7%, and to provide methods of preparing such compounds.

These and still further objects as shall hereinafter appear, are fulfilled by the present invention to a remarkably unexpected extent as can be discerned from the following detailed description and exemplary embodiments thereof, it being understood that the description and examples are presented to accomplish an understanding of our contribution but not to limit its inherent application or natural scope.

Thus, we have found that the disadvantages associated with the many prior art compositions may be overcome and that all of the aforestated objects and research goals attained by the preparation and utilization of the special coordination compounds (complexes) containing aluminum and having the formula:

$$Al_2(H_2O)_{y-z}(OH)_{6-nx}(A)_n(R)_z$$

wherein A is selected from the class consisting of chloride, bromide, iodide, sulfate and sulfamate; R is the coordinating moiety of a polyhydroxy compound having a carbon chain in which at least two carbon atoms link a hydroxyl group to said chain, $n$ is a positive integer of from 1 to 4; $x$ is the valence of A, $y$ is a value of about 0.5 to 6 and is always such that $(y-z)$ does not give a negative value; and $z$ is the number of available coordination sites, with $nx$ being from 2 to 4.

The preferred coordination compounds (complexes) of the present invention have the formula:

$$Al_2(H_2O)_{y-pz}(OH)_{6-nx}(A)_n(R)_p$$

wherein A is selected from the class consisting of chloride, bromide, idodide, sulfate and sulfamate; R is the coordinating moiety of a polyhydroxy compound having a carbon chain in which at least two carbon atoms link a hydroxyl group to said chain; $y$ is from 2 to 6 and need not be a positive integer; $p$ is the number of mols of the polyhydroxy compound and need not be a positive integer; $z$ is the number of available coordination positions occupied by R; $n$ is 1 to 4 but need not be a positive integer; and $x$ is the valence of A, with $nx$ being from 2 to 4.

The aforesaid formulae should not be interpreted as meaning that only water is displaced by R, since R could also displace any OH which are bound to the aluminum atoms. This could occur by virtue of multiple condensation of the polyol hydroxy groups with the hydroxy groups bonded to the aluminum atoms to form chelate structures, or by the assumption by the polyol of coordination sites vacated by the condensation of the hydroxy groups bound to the aluminum atoms. The condensation of two hydroxy groups to form an oxo group has been referred to as oxolation. Still other mechanisms can be postulated.

The optimum coordination compounds (complexes) of the present invention have the formula:

$$Al_2(H_2O)_{0.7-1.1}(OH)_{4.9-5.1}(Cl)_{0.9-1.1}$$
$$(1,2 \text{ propylene glycol})_{0.7-1.3}$$

In the above formula, the 1,2 propylene glycol may be present in the complex in a number of ways, namely with both carbinol hydrogen atoms being lost by condensation or neutralization, or with only one carbinol hydrogen atom being lost by condensation or neutralization, or with both hydroxy groups remaining intact and coordinated and/or chelated to one of the aluminum atoms.

In preparing the aluminum complexes shown above, particularly advantageous results are obtained by combining an aluminum salt selected from the group consisting of aluminum basic chloride, aluminum basic sulfate, aluminum basic sulfamate, aluminum basic bromide and aluminum basic iodide, with a polyhydroxy compound, that is, an organic compound containing two or more hydroxy groups which are linked to adjacent or non-adjacent carbon atoms. The aluminum salt and the polyhydroxy compound are thus combined to form a solution which, thereafter, is heated to form the aluminum complex of the present invention. Preferably, though not necessarily, the heating will continue until substantially all excess water is expelled from the solution and a dry product is formed. Under certain conditions, as shall appear, the solution is highly useful and drying can be omitted.

As used herein, the term "aluminum basic chloride," refers to those compounds having the formula:

$$AL_2(OH)_xCl_y$$

wherein: $x$ is a positive integer of from 2 to 5; $y$ is a positive integer of from 1 to 4; and $x$ and $y$ will always total 6. Representative of the aluminum basic chlorides herein contemplated are: $Al_2(OH)_2Cl_4$; $Al_2(OH)_4Cl_2$, $$Al_2(OH)_5Cl$$

Similar considerations apply with respect to aluminum basic iodide and aluminum basic bromide.

The term "polyhydroxy compound" as used herein, means those organic compounds containing two or more hydroxy groups (prior to condensation) linked to adjacent or non-adjacent carbon atoms. We specifically intended to include, although not be limited to, dihydric and polyhydric alcohols.

Other terms which may require specific definition will be defined herein as the need arises. In every instance, it is intended that all terms which are specifically defined herein shall carry such definitions whenever and however used and that all other terms will be accorded their art-accepted meaning within the context in which they are used.

Suitable aluminum salts for the practice of the invention include aluminum basic chloride, aluminum sulfate, aluminum basic sulfamate, aluminum basic iodide and aluminum basic bromide. Particularly fine results are obtained when an aluminum basic chloride having an aluminum to chlorine mol ratio of from about 1:2 up to about 2.1 to 1, more advantageously between about 1:1 to about 2:1, is used in the practice of the invention.

Suitable polyhydroxy compounds for use in the practice of the present invention includes: propylene glycol; 1,1,1-trimethylol propane; 1,3-butylene glycol (1,3-butane-diol); glycerine (1,2,3-trihydroxy propane); 2-methyl-2,4-pentane-diol; neopentyl glycol (2,2-dimethyl-1,3-dihydroxy pentane); polyethylene gylcol (mol. wt.= 400); Polyglycol 15-200 (a Dow material having an ethereal linkage between propylene oxide and ethylene and condensed with glycerine in which each chain has a terminal hydroxy group (mol. wt.=2700)); p-xylene $\alpha,\alpha$ diol; and polyepichlorohydrin; butyne-1,4 diol; 2-ethyl-1,3-hexane-diol; and polypropylene glycol (av. mol. wt.=400).

The preferred polyhydroxy compound is 1,2 propylene glycol. In addition, we have obtained superior products with 1,3-butane diol, and with trimethylolpropane.

In one embodiment of the present invention, we are able to modify aluminum chlorohydroxide to obtain a coordination compound of superior properties.

Specifically, we prepared an aqueous solution of aluminum chlorohydroxide (obtained from the Reheis Chemical Co., a division of Armour Pharmaceutical Company, trademark "Chlorohydrol") ranging from 43–50 percent solids and to this solution, added from about 53 to about 100% of 1,2 propylene glycol (based on the aluminum chlorohydroxide solids content). If speed is desired, the solution can be stirred slightly.

The reaction between the aluminum chlorohydroxide and the polyhydroxy compound should be effected at a temperature within the range of 50 to 120° C. Preferably, the reaction temperature should be of the order of 80 to 110° C. We have found that a temperature range of 90 to 105° C. is optimum. A reaction can be effected in the presence of agitation, such as stirring or other conventional mixing procedures. The time of the reaction is temperature dependent, and operational times may be determined for any specific concentrations and specific starting materials by routine testing within the skill of a worker in the art. Generally, a duration of the order of from a few minutes to several hours constitutes adequate reaction time. In addition to the reaction time being temperature dependent, it is also dependent upon the extent of agitation applied to the mixture.

The coordination compounds of the present invention may be dried by spray drying or by vacuum drying to a product containing between about 1 and 10 weight percent of moisture as determined by the Karl Fischer Assay method.

The spray drying temperatures to be used in the process of the present invention will vary depending on the size of the spray drier. With the Bowen No. 2 7-foot diameter spray drier and larger, an inlet temperature of 200° to 320° C. can be used, with the preferred inlet temperature being about 225° to 270° C. An outlet temperature range of 100° C. to 160° C. should be used. For laboratory size spray driers, such as a Bowen Flat-Bottom laboratory spray drier (30-inch diameter) an inlet temperature range of the order of 90° C. to 260° C. may be used, with a preferred inlet temperature range of 150° C. to 210° C. With such small size spray driers, an outlet temperature within the range of 80 to 125° C. may be used, with the preferred outlet temperature range being between 100° C. and 120° C.

It has been found that the spray dried product should be cooled as rapidly as possible to a temperature of 50° C. or less.

One system, which has been proven successful, consists of an air conveying system. Product is removed from the drier waste gas stream through a rotary lock valve. The product at a temperature of approximately 100° to 160° C. is dropped into an air stream, cooled and conveyed to a final collection point. The conveying air is ambient air that has been cooled to less than 45° F. maximum by a refrigeration system. At the cold temperature, the air is saturated with water vapor. In the process of cooling the hot product, the air is naturally warmed to 70–80° F. with no additional water being added to the air since no additional product drying is occurring. The resultant relative humidity of the air is less than 40%. Any ambient air temperature below 45° F. is advantageous due to the lower relative humidity after being heated. The temperature of the final product is dependent upon the air flow rate. A flow rate of approximately 10% of the total drier air flow rate cools the product to 80° F. with a 45° F. inlet temperature. If the spray dried product is not cooled as rapidly as possible, then deterioration sets in, and in particular, impaired solubility in anhydrous alcohol, and reduced compatibility with aerosol propellants, such as fluorohydrocarbons results.

In connection with vacuum drying, such vacuum drying should be achieved at a temperature of 65 to 120° C., a vacuum of the order of 7 millimeters of mercury up to atmospheric pressure, and a drying time of 1 hour to 100 hours. When all of the water has been removed, further heating may produce decomposition (this will vary depending on the complex and on the temperature). Examples of vacuum, temperature and time include a vacuum of 7 millimeters mercury, a temperature of 70° C. and a drying time of 1 hour; and a vacuum of 25 millimeters of mercury, a temperature of 90 to 95° C. and a drying time of 5 hours. The more rapid the drying, under the lowest pressures gives a more soluble in anhydrous alcohol and more compatible product.

Spray drying is normally superior to vacuum drying, although the more rapid vacuum drying approaches the results obtained by spray drying.

As above-indicated the range of water as determined by the Karl Fischer Assay method in the final product should be of the order of 1 to 10 weight percent. Preferably, it should be of the order of about 4½ to 7%, with about 5 weight percent being optimum.

In all cases, an excess of polyhydroxy compound should be used to prepare the coordination compounds of the present invention, since a significant amount of polyhydroxy compound is lost by evaporation (such evaporated polyhydroxy compound can be recovered by condensation). The evaporation of the polyhydroxy compound occurs during refluxing, although where spray drying forms the drying method, a major portion of the evaporated polyhydroxy compound is lost during the spray drying. With spray dried coordination compounds of the present invention, on the order of 30 to 50 weight percent of the initial amount of the polyhydroxy compound is lost on evaporation. For this reason, it is necessary to start off with an excess amount of glycol, since if the stoichiometric amount of glycol is used initially, the correct ratio of glycol to aluminum will not be achieved in the final product. During spray drying, glycol and water are the only materials being removed. Thus, for example, we can commence with a ratio of 0.95 mol of aluminum per mol of propylene glycol and get a final product which contains a ratio of about 2 mols of aluminum per mol of propylene glycol.

Produced in the manner indicated, the complex (that is, the "dry" product) exhibits antiperspirant properties which compare favorably by subjective evaluation to aluminum chlorohydroxide. This effect is believed to result from our retention of the ionicity of the aluminum in our complex.

While the exact mechanism of the reaction is not fully understood, it is believed to involve the displacement of free and bound water and, possibly, a displacement or condensation with hydroxy groups attached to the aluminum ion. The hydroxy groups of the polyhydroxy compound appear to be unreactive with the chloride ion. As will appear, the substitution of glycerine and similar polyhydroxy compounds for the propylene glycol described above provides coordination compounds of similar solubility in non-aqueous media. This, as will be shown, is true for many other polyhydroxy compounds.

Examining the illustrative practice of the process of the invention in greater detail, 900 grams of $Al(OH)_5Cl$ (Chlorhydrol) in a 50% aqueous solution are mixed with 350 grams of propylene glycol (U.S.P. grade) and the reagents are stirred thoroughly. The mixture is then heated, preferably while the stirring continues, to a temperature of from about 95–100° C. Next, the heated solution is permitted to evaporate until its volume is reduced to about 0.8 of the original volume and the solution is then poured into shallow trays. Particularly advantageous are shallow drying trays which have been coated with Teflon. (Du Pont brand polytetrafluoroethylene resin.) The material in the shallow trays is then dried to a constant weight at about 170° F. under a vacuum of approximately 25 inches mercury, namely a pressure of about 4.9 inches mercury, for about 40 hours, that is, until a dry product is formed. By "dry" we mean, the product obtains a moisture loss rate under the specified conditions of less than about 0.5% per hour, and is a friable solid containing from 1.0 to about 10% water as determined by Karl Fischer Assay. This dry product comprises our novel aluminum complex, the nature and use of which shall be described hereinafter in detail.

In the foregoing, the aluminum-containing starting material may be of any percent solution although the water content should be reasonable since the presence of excessive water merely increases the cost of drying and too little water obstructs efficient mixing. Preferably there will be enough water to enable the aluminum reagent to be characterized a "liquid" although a viscous liquid is quite satisfactory. A "viscous liquid" we define as one possessing a viscosity at 25° C. of from 100–300 centipoises.

The polyhydroxy compound can contain some water although if desired anhydrous compound (i.e., 100%) works well.

The stirring of the two reagents comprises an effective expedient for mixing and evaporation although when time is of no particular consideration, the stirring can be omitted without any clearly discernible impairment of product quality. Similarly, there is no objection to the use of other conventional mixing procedures in lieu of stirring if the exigencies of a particular installation render it either feasible or desirable. Similarly, other known techniques for encouraging a more or less rapid rate of evaporation may be used if desired; the inducement of such an increased rate being, of course, a matter of convenience and time-saving.

The evaporation over heat is calculated to significantly reduce the time necessary to accomplish the final drying. A volume reduction to about 0.8 times the original volume provides a convenient and readily discernible measure for it is at about this amount of volume reduction that the reacting solution acquires visible viscosity.

The drying trays may be formed of glass or of any other material which is capable of remaining inert with respect to our ingredients. Iron, particularly, should be avoided because it does react and will cause a most disagreeable product discoloration. The shallow trays themselves are extremely helpful because they expose a greater area of material and thereby expedite the evaporation process.

The exact chemical structure of the new complexes of this invention are not fully understood although it is believed that they involve coordination chemistry and therefore will be described from that point of view. Present day instruments do not permit an exact structural analysis of the compounds and it is therefore necessary to hypothecate as to the structure.

Because the complexes of the present invention are of an inorganic-organic nature, it is impossible to conduct straight-forward physical measurements of them and obtain meaningful results. On the other hand, the complex obtained by reacting aluminum basic chlorohydroxide (Chlorhydrol) and propylene glycol has been the object of extensive testing which assists in characterizing the complex. Thus, in Table I, below, results of extensive solubility testing of the complex is reported. Table II below reports the results of comparing the complexes and Chlorhydrol is an aqueous system by titration with sodium hydroxide. From Table II, it is manifest that the complex is a new entity even though they have dissociation similarities, they have significant difference in precipitation points and redissolution points.

TABLE I 250 mg. increments of a complex (formed by reacting aluminum basic chloride (Chlorhydrol brand) with propylene glycol and drying) having an assay of 19% Al, 12.6% Cl and 3.5% $H_2O$ was admixed with 50 grams of the following solvents and the following results were obtained:

| Solvent— | Solubility of complex |
|---|---|
| Methyl ethyl ketone | Insol. |
| Acetophenone | Insol. |
| Benzyl alcohol | Insol. |
| Sec-butyl alcohol | Insol. |
| Tert-butyl alcohol | Insol. |
| Isoamyl alcohol | Insol. |
| Aniline | Insol. |
| Carbitol (diethylene glycol | Insol. |
| Isopropyl alcohol | Insol. |
| Toluene | Insol. |
| 1,3-butanediol | Insol. |
| Acetone | Insol. |
| Isopropyl ether | Insol. |
| Dimethyl sulfoxide | Insol. |
| Chloroform | Insol. |
| n-Hexane | Insol. |
| Ether | Insol. |
| Pyridine | Insol. |
| n-Butyl alcohol | 10 gms. (16% wt./wt.). |
| Dimethyl formamide | 37 gms. (42% wt./wt.). |
| Anhydrous methanol | 110 gms. (68% wt./wt.). |
| Glycerin | 45 gms. (45% wt./wt.). |
| Hexyl alcohol | 1.0 gm. (1.9% wt./wt.). |
| n-Propanol | 35 gms. (41% wt./wt.). |
| Ethanol | Greater than 50% (wt./wt.). |
| Water | Greater than 50% (wt./wt.). |

TABLE II

Effect of titrating with NaOH when aluminum basic chloride (Chlorhydrol brand) and complex (formed as in Table I) are in near equal aluminum concentrations in an aqueous system.

| Criteria | Complex | Aluminum Basic Chloride (Chlorhydrol Brand) |
|---|---|---|
| Precipitation Starts | 8.9 | 6.6–6.7 |
| Redissolution Starts | 11.0 | 11.5 |

To further aid in the understanding of the present invention, and not by way of limitation, the following examples are presented.

Example I

To an open container, 200 gms. of 50% aluminum chlorhydroxide solution and 200 gms. of propylene glycol are heated at 120° C. for one hour. The pale yellow, slightly viscous liquid weighed 256.7 gms. and was completely miscible with methanol, 95% ethanol and isopropanol. The theoretical yield, assuming all free and bound water to be lost, was 278.7 gms.

Example II 75 gms. of aluminum chlorhydroxide (25.0% Al; 16.8% Cl) was dissolved in 100 gms. of water and 40 gms. of propylene glycol. This mixture was heated to near boiling for several minutes and thereafter cooled. The solution was then evaporated to dryness under a vacuum (about 10 mm. mercury) at about 70° C. The recovered yield was 98 gms. of white crystalline solids which assayed 18.1% aluminum (theoretical=101.5 gms.). This product was readily soluble in anhydrous SDA-40 alcohol to at least 25.4% and to at least 40% by concentration with heat.

Example III

Dissolved 75.0 g. granular aluminum chlorhydroxide (25.0% Al) in 100 ml. water and added 40 g. U.S.P. propylene glycol. The clear solution was transferred to a glass tray and dried to constant weight in a forced draft air oven at 75° C. Yield: 94.3 g. Soluble to at least 20% in anhydrous ethanol.

*Analysis.*—19.6% aluminum, 12.8% chloride, 8.5% water.

Example IV

Dissolved 75.0 granular aluminum chlorhydroxide (25.0% Al) in 100 ml. water and added 60 g. propylene glycol. Heated with evaporation to the consistency of a heavy syrup. Dried to constant weight in rotary vacuum dryer at 75° C. and about 15 mm. Hg. Yield: 97.0 g. Product soluble in anhydrous ethanol to more than 30%.

*Analysis.*—18.2% aluminum, 11.9% chloride, 4.1% water.

Example V

Into a 500 ml. round bottom flask equipped with a distilling head, added 200 g. 50% aluminum chlorhydroxide (12.55% Al) and 200 g. propylene glycol. The mixture was distilled until the residue temperature reached 146° C. leaving a clear, slightly yellow, highly viscous liquid which was miscible in all proportions with anhydrous ethanol. Yield: 282 g.

*Analysis.*—8.65% aluminum, 6.15% chloride, 5.65% water.

Example VI

Heated 300 g. of 50% aluminum chlorhydroxide (12.55% Al) and 120 g. propylene glycol at 100° C. for 0.5 hour. Transferred to glass tray and dried at 65–70° C. and 25 inches of vacuum (4.9 in. Hg pressure). Yield: 200 g. of waxy solids readily soluble in anhydrous ethanol.

*Analysis.*—18.55% Al, 12.2% Cl, 4.66% $H_2O$. 41.5% propylene glycol by Periodic Acid Method, 40.5% propylene glycol by Carbon analysis.

Example VII

Mixed 225 g. 50% aluminum chlorhydroxide (12.55% Al) and 50 g. propylene glycol and heated at 95° C. for 0.5 hour. Vacuum tray dried at 75° C. and 4.9 in. Hg to a constant weight. Yield: 129 g. Solids very slowly soluble to at least 20% in anhydrous ethanol.

*Analysis.*—21.3% Al, 14.3% Cl, 7.2% $H_2O$.

Example VIII

Mixed 100 g. of 50% aluminum chlorhydroxide (12.4% Al) and 34.8 g. propylene glycol and dried to constant weight in vacuum tray oven at 120° C. and 4.9 in. Hg. Yield: 59.1 g. Very slowly soluble to at least 30% in anhydrous ethanol.

*Analysis.*—20.7% Al, 14.0% Cl, 2.43% $H_2O$.

Example IX

Heated 150.5 g. of 50% aluminum chlorhydroxide (12.55% Al) and 26.6 g. propylene glycol at 95° C. for 1.0 hour allowing solution to concentrate. Vacuum tray dried at 4.9 in. Hg and 60° C. until solids were no longer sticky. Yield: 96.0 g. Very soluble in anhydrous ethanol.

*Analysis.*—19.6% Al, 13.05% Cl, 15.2% $H_2O$.

Example X

To 150 g. 50% aluminum chlorhydroxide (12.55% Al) added 8.0 g. concentrated hydrochloric acid such that Al/Cl=1.55. The solution was refluxed for 1.0 hour and 58.4 g. propylene glycol added to the hot solution. The solution was vacuum tray dried at 25 in. Hg and 70–75° C. Yield: 99.0 g. Solubility in anhydrous ethanol was greater than 30%.

*Analysis.*—18.0% Al, 14.6% Cl, 5.0% $H_2O$.

Example XI

To 150 g. 50% aluminum chlorhydroxide (12.55% Al) added 28 ml. concentrated hydrochloric acid such that Al/Cl=1.0. Heated the solution 1.0 hour at 95° C. and added 58.4 g. propylene glycol with continued heating for 0.25 hour. Vacuum tray dried at 4.9 in. Hg and 70–75° C. to constant weight of 112 g. The solubility in anhydrous ethanol was 27.6%.

Example XII

Heated 150 g. 50% aluminum chlorhydroxide (12.55% Al) and 100.5 g. of concentrated hydrochloric acid for 1.0 hour at 95° C. such that Al/Cl=0.5. Added 58.4 g. of propylene glycol and continued heating for 15 minutes. Vacuum tray dried to constant weight at 4.9 in. Hg and 70–75° C. Yield: 148 g. Soluble to extent of 20.5% in anhydrous ethanol.

Example XIII

Added propylene glycol to a 50% solution of aluminum chlorhydroxide such that the ratio of aluminum to glycol was 0.7. The mixture was heated 2 hours at 95° C. and adjusted to an aluminum concentration of 8.3%. The cooled solution was spray dried at an inlet of 500° F. and an outlet of 175° F. to give a free flowing powder which was rapidly soluble to the extent of at least 30% in anhydrous ethanol.

*Analysis.*—19.7% Al, 13.2% Cl, 9.35% $H_2O$.

Example XIV

Into a 500 ml. round bottom flask fitted with agitation and a distilling head, added 100 g. of 50% aluminum chlorhydroxide, 40 g. of propylene glycol and 100 ml. anhydrous ethanol. Simultaneously added 300 ml. of anhydrous ethanol while distilling off the ethanol-water azeotrope. While continuing the distillation, slowly added 300 ml. benzene and enough ethanol to prevent gelation. Then continued adding ethanol until all of benzene had distilled over. The residue consisted of 142 g. of a slightly yellow alcoholic solution of the aluminum derivative.

*Analysis.*—6.56% Al, 4.14% Cl, 3.1% $H_2O$.

Example XV

Trimethylol propane.—Dissolved 34.9 g. of trimethylol propane [1,1,1-tris(hydroxymethyl) propane] in 141.5 g. aluminum chlorhydroxide (12.55% Al) and heated at 95° C. for 1 hour. Vacuum tray dried at 65° C. and 4.9 in. Hg to constant weight. Yield: 93.5 g. Soluble to at least 30% in anhydrous ethanol.

*Analysis.*—18.5% Al, 12.25% Cl, 4.6% $H_2O$.

Example XVI

Heated 141.5 g. aluminum chlorhydroxide and 41.2 ml. of 1 N HCl at 95° C. for 2 hours such that the aluminum to chloride ratio was 1.75. Dissolved 34.9 g. of trimethylol propane into the solution and continued heating for 1 hour. Dried to constant weight in vacuum tray oven at 70° C. and 4.9 inch Hg. Yield: 94.5 g. Product soluble to at least 30% in anhydrous ethanol.

*Analysis.*—18.1% Al, 14.0% Cl, 8.25% $H_2O$.

Example XVII

To 141.5 g. of 50% aluminum chlorhydroxide added 21.4 ml. of 1.0 N HCl such that the ratio of aluminum to chloride was 1.85. Heated at 95° C. for 2 hours, added 29.1 g. of trimethylol propane and continued heating 1 hour. The clear solution was dried in the vacuum tray oven to a constant weight of 90.2 g. at 65° C. and 25 inch Hg vacuum. The resulting solid was soluble in anhydrous ethanol to at least 30%.

*Analysis.*—18.8% Al, 13.5% Cl, 6.2% $H_2O$.

Example XVIII

Glycerin.—Dissolved 75 g. granular aluminum chlorhydroxide (25.0% Al) in 100 ml. water and added 40 g. U.S.P. glycerin. Heated at 100° C. with evaporation until the solution reached a syrupy consistency. Dried in vacuum tray oven at 80° C. and 4.9 in. Hg. Yield: 96.5 g. Product soluble to the extent of 3.1% in anhydrous ethanol.

*Analysis.*—19.2% Al, 12.7% Cl, 1.3% $H_2O$.

Example XIX

Heated 150 g. of 50% aluminum chlorhydroxide and 40 g. glycerin at 100° C. for 0.5 hour. Evaporated in rotary vacuum drier at 75° C. and about 15 mm. Hg until solids were no longer sticky. Yield: 101 g. Product very slowly soluble to extent of about 20% in anhydrous ethanol.

*Analysis.*—18.3% Al, 12.2% Cl, 14.3% $H_2O$.

Example XX

Dissolved 75 g. granular aluminum chlorhydroxide (25.0% Al) in 100 ml. water and added 40 g. 1,3-butanediol. Concentrated to viscous syrup at 100° C. and dried in rotary vacuum drier to constant weight at 80° C. and about 15 mm. Hg. Yield: 95.3 g. Soluble to at least 20% in anhydrous ethanol.

*Analysis.*—19.6% Al, 12.9% Cl, 8.7% $H_2O$.

Example XXI

Dissolved 82.8 g. of 50% aluminum chlorhydroxide (12.2% Al) in 254 g. ethylene glycol. Using agitation, heated at 100° C. and allowed water to evaporate. After about 1 hour, a crystalline precipitate started forming. After about 6 hours heating, the crystals were filtered, washed with methanol, and dried in vacuum oven at 60° C. and about 4.9 in. Hg. Yield: 16.5 g. Product soluble in water and insoluble in alcohol.[2]

*Analysis.*—21.7% Al, 14.45% Cl, 4.4% $H_2O$. Theory for $Al_2$ (ethylene glycol) $(OH)_2(H_2O)_{0.7}Cl$: 21.7% Al, 14.25% Cl, 5.06% $H_2O$.

Example XXII

Mixed 75 g. of 50% aluminum chlorhydroxide (12.55% Al) and 69.0 g. Carbowax 400 (polyethylene glycol with average molecular weight of 400) and heated at 95° C. for 0.5 hour. Evaporated to constant weight at 75° C. and 4.9 in. Hg. Yield: 99.0 g. of off-white, waxy feeling solids soluble to at least 30% in anhydrous ethanol.

*Analysis.*—9.13% Al, 6.08% Cl, 6.2% $H_2O$.

Example XXIII

Heated 141.5 g. of 50% aluminum chlorhydroxide (12.34% Al) and 65.2 g. of triethylene glycol at 90° C. for 2 hours. Dried in vacuum oven at 65–70° C. and 4.9 in. Hg. Yield: 125 g. Product soluble in anhydrous ethanol to extent of at least 30%.

*Analysis.*—14.0% Al, 9.3% Cl, 6.9% $H_2O$.

Example XXIV

Heated 81.8 g. of 50% aluminum chlorhydroxide (12.55% Al) and 65.1 g. of 70% sorbitol at 95° C. for 0.5 hour. Dried to constant weight at 70° C. in rotary vacuum drier at about 15 mm. Hg. Yield: 78.0 g. Prod-

---

[2] Example XXI demonstrates the insolubility in alcohol of a complex formed from a polyhydroxy compound having a hydroxy group on each carbon atom. Where such a polyhydroxy compound is used, it generally lowers the solubility of the complex in alcohol.

uct soluble to extent of only 1.2% in anhydrous ethanol but very soluble in methanol.

Analysis.—12.7% Al, 5.44% $H_2O$.

Example XXV

Dissolved 45.5 g. of mannitol in 81.8 g. of 50% aluminum chlorhydroxide (12.55% Al) by heating at 95° C. Heating at 95° C. for 7 hours prevented precipitation on cooling. The clear solution was dried at 70° C. and 4.9 in. Hg to yield 82.0 g. of white powder. The product was soluble to extent of 1.9% in anhydrous ethanol and slightly soluble in methanol.

Analysis.—12.8% Al, 8.0% Cl, 10.5% $H_2O$.

Example XXVI

Mixed 98 g. of 50% aluminum chlorhydroxide (12.55% Al) and 59.1 g. of 2-methyl-2,4-pentanediol and heated at 90–95° C. for 1.0 hour. Drying to constant weight in vacuum tray oven at 50° C. and 25 in. Hg resulted in viscous slurry. The slurry was completely dissolved in about 100 ml. of anhydrous methanol and dried to constant weight at 50° C. and 4.9 in. Hg. Yield: 86.0 g. of glassy solids soluble to the extent of 30% in anhydrous ethanol, but solidified to a clear gel on standing 15 hours.

Analysis.—14.2% Al, 9.25% Cl, 7.95% $H_2O$.

Example XXVII

Dissolved 48.0 g. of neopentyl glycol (2,2-dimethyl-1,3-dihydroxy pentane) in 150 g. of 50% aluminum chlorhydroxide (12.55% Al) and heated at 95° C. for 0.5 hour. The clear solution was vacuum tray dried at 70° C. and 4.9 in. Hg. Yield: 106 g.—soluble to at least 30% in anhydrous ethanol.

Analysis.—17.5% Al, 11.6% Cl, 8.4% $H_2O$.

Example XXVIII

Heated 150 g. of 50% aluminum chlorhydroxide (12.55% Al) and 39.6 g. of technical grade 1,4-butynediol ($HOH_2C$—$C\equiv C$—$CH_2OH$) at 95° C. for 0.5 hour. Evaporated to constant weight at 75° C. and 4.9 in. Hg. Yield: 102.0 g. of orange glassy solids. Product soluble in anyhydrous ethanol but tended to form gel at concentrations up to 30%.

Analysis.—17.5% Al, 11.3% Cl, 11.2% $H_2O$.

Example XXIX

Added 39.0 g. of 2-ethyl-1,3-hexanediol and 87.0 g. of 50% aluminum chlorhydroxide (12.55% Al) to a rotary vacuum drier and evaporated to constant weight at 70° C. and 10–15 mm Hg. The resulting paste-like slurry was completely dissolved in 200 ml. of anhydrous methanol and dried in vacuum tray oven at 70° C. and 4.9 in. Hg. Yield: 77.8 g. Product soluble to at least 30% in anhydrous ethanol.

Analysis.—14.8% Al, 9.8% Cl, 8.8% $H_2O$.

Example XXX

Heated an incompatible mixture containing 40 g. of Dow P–400 (polypropylene glycol with average molecular weight of 400) and 174.1 g. of 50% aluminum chlorhydroxide (12.4% Al) to 95° C. but with no apparent effect. Such a mixture would have a theoretical molecular aluminum to glycol ratio of 8.0. The mixture was evaporated to constant weight in a rotary vacuum drier at 70° C. and 10–15 mm. Hg. The resulting slurry was dissolved in 300 ml. of anhydrous methanol and dried to a constant weight at 70° C. and 4.9 in. Hg. Yield: 115 g. Product soluble in anhydrous ethanol but formed a clear gel at concentrations higher than 19%.

Analysis.—18.1% Al, 12.0% Cl, 11.5% $H_2O$.

Example XXXI

In a rotary vacuum drier, evaporated 130.6 g. of 50% aluminum chlorhydroxide (12.4% Al) and 67.5 g. of Dow polyglycol 15–200 (polymeric chains of ethylene and propylene oxide condensed with glycerin and having three terminal hydroxy groups—average molecular weight=2700) to a constant weight at 70° C. and 10–15 mm. Hg. The resulting slurry was filtered to remove 39 g. of unreacted glycol. The solids were dissolved in 300 ml. of anhydrous methanol and evaporated to constant weight at 70° C. and 4.9 in. Hg. Yield: 55 g. Product soluble in anhydrous ethanol to the extent of 15% to form a solid gel which tends to liquefy on reducing the temperature to near 0° C.

Analysis.—19.9% Al, 13.2% Cl, 12.3% $H_2O$.

Example XXXII

Dissolved 23.5 g. of sulfamic acid in 75 ml. water. With stirring reacted 111.0 g. of an aluminum hydroxide gel (0.25 mol Al) at about 50° C. until complete solution resulted. Added 76 g. of propylene glycol and continued heating at 50° C. for 1 hour. Evaporated the clear solution at 50° C. and 10–15 mm. Hg pressure to near constant weight to yield 104.6 g. of a clear viscous liquid which was slowly soluble in methanol and slightly soluble in ethanol.

Assay.—6.53% Al. 2.6% N, 2.5% $H_2O$.

Example XXXIII

Dissolved 19.8 g. of sulfamic acid in 40 ml. water. With stirring and maintaining temperature at 45–50° C., completely reacted 169 g. of an aluminum hydroxide gel (0.38 mol Al). Added 116 g. of propylene glycol and continued heating for 1 hour at 50° C. The clear solution was evaporated at 10–15 mm. Hg pressure and 50° C. to near constant weight to yield 149 g. of clear viscous solution, which was very soluble in methanol and partially soluble in ethanol.

Assay.—7.15% Al, 1.69% N, 3.6% $H_2O$.

Example XXXIV

Dissolve 48.5 g. of p-xylene alpha,alpha-diol in 152 g. of 50% aluminum chlorhydroxide by heating to 100° C. Filtered to remove insoluble matter and dried in rotary vacuum drier at 80° C. and 10–15 mm. Hg pressure to 114.9 g. of solids which were insoluble in anhydrous ethanol. Completely dissolved the solids in anhydrous methanol and added 24.2 g. of the diol with slight heating. After filtering, the clear alcoholic solution was dried as above to yield 129.6 g. of white crystalline solids soluble to the extent of about 30% by weight in anhydrous ethanol.

Assay.—13.1% Al, 8.71% Cl, 10.4% $H_2O$.

Example XXXV

Heated 152 g. of 50% aluminum chlorhydroxide and 40 g. of Dow's polyglycol 166–450, which is a polyepichlorohydrin [$HO(C_3H_5ClO)_nC_3H_5ClOH$] with an average molecular weight of 450, to 95–100° C. for 1 hour. The clear homogeneous solution was vacuum dried at 10–15 mm. Hg pressure and 70° C. to 109.5 g. of solids. The solids were dissolved in 200 ml. of anyhdrous methanol and redried under the same vacuum conditions to near constant weight. The yield was 105.7 g. of white solids soluble to the extent of about 15% in anhydrous ethanol.

Assay.—17.8% Al, 17.15% total Cl, 10.0% $H_2O$.

Another important aspect of the present invention is the incorporation of the coordination compounds of this invention in combination with certain of the so-called aerosol propellants such, for example, as trichloromonofluoromethane (Freon 12), dichlorotetrafluoroethane (Freon 114), monochlorodifluoromethane (Freon 22), trichlorotrifluoroethane (Freon 113), octafluorocyclobutane (Freon C 318), pentafluoromonochloroethane (Freon 115), dimethyl ether, vinyl chloride, nitrous oxide, nitrogen, 1,1 - difluoroethane and 1,1,1 - chlorodifluoroethane. Of course, it is anticipated that some of the more exotic, and hence more expensive, propellants may be utilized although they contribute nothing which cannot be obtained from the more conventional and hence less expensive propellants as listed above.

The alcohol carrier can be any of the approved denatured ethyl alcohols such, for example, as: SDA–23A; SDA–28B; SDA–39B; SDA–39C; SDA–40; SDA–40A and the like as well as isopropyl alcohol, and the di- and polyhydric alcohols. The di- and polyhydric alcohols can be used alone or in addition to a primary solvent since it appears to enhance the miscibility of the solvent with the propellant.

Using the complexes of the invention, a variety of antiperspirant formulations were prepared for use as lotions, colognes, powders, as well as in aerosol formulations. Thus, while our complexes are especially suited for use in aerosol dispensers, we also find them to be excellent when used for their antiperspirant qualities irrespective of aerosol dispensers.

The further examples set forth below, show suitable formulations of the type indicated in which the complex prepared according to Example I (denoted "ASC") is used to typify the complexes herein described.

Example XXXVI

Lotion:                                           Parts
    Cerosynt 1000–D _____ 3.0
    Emulsynt 2400 _____ 7.0
    Lanolin (anhydrous) _____ 1.0
    Water _____ 62.0
    ASC _____ 27.0
    Perfume _____ q.s.

Example XXXVII

Cologne:
    S.D. alcohol #40 _____ cc__ 50
    Sindar G–11 _____ g__ 0.25
    Water _____ cc__ 113
    Versene Regular _____ cc__ 0.1
    ASC _____ g__ 27.0
    Perfume _____ q.s.

Example XXXVIII

Powder:                                          Grams
    ASC _____ 13.0
    Calcium carbonate _____ 3.0
    Sindar G–11 _____ 0.5
    Talcum _____ 83.5

Example XXXIX

AEROSOL FORMULATIONS WITH ASC

|  | A | B | C | D | E | F | G |
|---|---|---|---|---|---|---|---|
| ASC | 10 | 10 | 10 | 15 | 10 | 10 | 15 |
| SDA–40 | 60 | 59 | 35 | 55 | 60 | 50 | 55 |
| Propylene Glycol | 5 | 5 | 5 | 5 | | | |
| Glycerin | | | | | 5 | | 5 |
| Tetraethylene Glycol | | | | | | 15 | |
| Amerchol L101 | | 1 | | | | | |
| Freon 114/12 (90%/10%) | 25 | 25 | 50 | 25 | 25 | 25 | 25 |

In Examples XXXVI to XXXIX, Cerosynt 1000–D is a brand of glycerol monostearate manufactured by Van Dyk & Company; Emulsynt 2400 is a brand of polyoxyethylene glycol laurate/oleate manufactured by Van Dyk & Company; Sindar G–11 is a brand of hexachlorophene manufactured by Sindar Corporation, New York, N.Y.; Versene Regular is a brand of tetrasodium salt of ethylenediamine tetracetic acid manufactured by the Dow Chemical Company, Midland, Michigan; Amerchol L101 is a lanolin-derived sterol extract manufactured by American Cholesterol Products, Inc.; Freon 114 is a dichlorotetrafluoroethane manufactured by Du Pont Company, Wilmington, Del.; Freon 12 is a dichlorodifluoromethane manufactured by Du Pont and Freon 114/12 is any desired mixture of Freon 114 and Freon 12.

While the upper concentration limit for the complex in aerosol formulations is dependent upon the entire formulation, it generally ranges from 9 to 15 weight percent of the formulation. At high weight percent values, and higher, valve clogging and/or tackiness may be encountered with many formulations.

Example XXXX

Into a heated flask equipped with a reflux condenser added 4000 g. of a 50% aluminum chlorhydroxide solution and 80.0 g. of a 32° Bé. aluminum chloride solution, such that the aluminum to chloride ratio was about 1.90. Using agitation, the mixture was refluxed at between 100 and 105° C. for 6.0 hours. To the mixture was added 1404 g. propylene glycol. The clear aqueous solution was concentrated by heating at about 105° C. until a total of about 1090 ml. of distillate was collected.

The homogeneous concentrate was spray dried through a Bowen Flat-Bottom spray dryer (30-inch diameter) at an inlet temperature of about 280° F. and an outlet temperature of about 200° F. The powdered product was rapidly soluble to the extent of at least 30% in anhydrous ethanol.

$Assay$.—19.3% Al, 13.6% Cl, 7.95% $H_2O$ (by Karl Fischer).

Example XXXXI

To a heated, agitated mixture of 500 g. 32° Bé. aluminum chloride, 533 g. propylene glycol and 765 ml. water, reacted a total of 139 g. of aluminum powder over a period of about 5 hours and a temperature of 90–100° C. The reaction product was allowed to concentrate by further heating to about 1575 g. net weight and an additional 5.0 g. of aluminum added. When the reaction became vigorous, the mass was filtered to yield a clear aqueous solution having a viscosity of about 188 cps.

The concentrate was spray dried through a Bowen Flat-Bottom spray dryer (30-inch diameter) at an inlet of 405° F. and an outlet temperature of about 245° F. The product was rapidly soluble to the extent of at least 30% in anhydrous ethanol.

$Assay$.—19.8% aluminum, 13.6% chloride, 6.6% $H_2O$ (Karl Fischer).

Example XXXXII

Into a 500 gallon reactor equipped with agitation and a condenser was charged 3300 lbs. of a basic aluminum chloride solution (assay: 12.4% Al, 8.55% Cl). The solution was refluxed at about 103° C. for 4.0 hours and 1158 lbs. of U.S.P. propylene glycol added. The mixture was allowed to concentrate at a temperature in excess of 105° C. until the viscosity of the mixture at 25° C. reached 180 cps.

Suitable quantities of the cooled clear concentrate were spray dried through a Bowen No. 2, 7-foot diameter, spray dryer. The following table describes the product characteristics as a function of the drying conditions.

| Inlet, °F. | Outlet, °F. | Percent | | | Solubility in Anh. Ethanol, Percent | $CCl_4$ Compatibility, cc.[1] |
|---|---|---|---|---|---|---|
| | | Al | Cl | $H_2O$ | | |
| 600 | 300 | 19.9 | 13.7 | 6.7 | >50 | 159 |
| 510 | 320 | 20.2 | 14.0 | 5.1 | >50 | 154 |
| 450 | 285 | 20.0 | 13.8 | 6.2 | >50 | 173 |

[1] Defined as the number of cc.'s of carbon tetrachloride to effect a permanent cloudiness to 60 g. of a 30% solution of the product in anhydrous ethanol. Approximately 3 cc. of $CCl_4$ is equivalent to 1 cc. of a 60/40 mixture of Fluorocarbon 14 and 112.

Example XXXXIII

The aluminum complex prepared by Example XXXXII was used in the following formulation.

Component:                                    Parts by weight
    Aluminum complex _____ 9
    Hexadecyl alcohol _____ 3
    Silicon (Dow-Corning Silicone 555) ____ 1
    S.D. 40 anhydrous alcohol _____ 36.55
    Dichlorotetrafluoroethane _____ 20
    Trichloromonofluoromethane _____ 30
    Hexachlorophene _____ 0.2
    Perfume _____ 0.5

The above formulation had a pH of 3.5. It was packed in a commercially available aerosol can with a rolled-on liner of double-coat vinyl over epoxy resins. It was shelf tested for a period in excess of 12 months and found to be most satisfactory at the end of such period.

From the foregoing it becomes apparent that new and novel complexes (coordination compounds) and methods of preparing them as well as methods and formulations for utilizing them as antiperspirants and especially, though not exclusively, as aerosol dispensed antiperspirants, has been herein described and illustrated which fulfill all of the aforestated objectives and research goals to a remarkably unexpected extent. It is, of course, understood that this description and accompanying examples are presented for illustrative purposes only and not by way of limitation and that such modifications, alterations and applications as may readily occur to the artisan confronted with this disclosure are included within the spirit of this invention, especially as it is defined by the scope of the claims appended hereto.

What is claimed is:

1. The method of preparing an inorganic-organic coordinated complex of aluminum comprising mixing an aqueous solution of an aluminum-containing material selected from the class consisting of aluminum basic chloride and alumnium basic bromide; with a polyhydroxy compound, having at least 2 carbon atoms, each of which is linked to a hydroxy group, to form a mixture; heating said mixture at a temperature of between about 80° to 110° C.; and spray drying said mixture at a temperature of between 80° C. and 320° C. and atmospheric pressure to obtain a product having a water content of from about 1.0 to about 10 weight percent determined by Karl Fischer analysis, said product being said complex.

2. The method of claim 1 in which the aluminum-containing material is aluminum basic chloride of the general formula $Al_2(OH)_5Cl$.

3. The method of claim 2 in which the spray dried material is rapidly cooled to a temperature below 50° C.

4. The method of claim 3 in which the mixture is heated to a temperature of between 90° C. to 105° C.

5. The method of claim 4 in which the product is spray dried to a water content of from about 4½ to 7 weight percent determined by Karl Fischer analysis.

6. A method in accordance with claim 2 in which at least a portion of the water is removed by evaporation at the temperature of 80° to 110° C. prior to the spray drying.

7. The method of preparing an inorganic-organic coordinated complex aluminum comprising reacting aluminum powder, aluminum chloride, propylene glycol and water at a temperature on the order of about 90° to 100° C., concentrating the reaction product by further heating at said temperature, and spray drying said reaction product at an elevated temperature above 100° C. and atmospheric pressure to obtain a product having less than 10 weight percent water determined by Karl Fischer analysis.

8. The method according to claim 2 in which the polyhydroxy compound is selected from the group consisting of propylene glycol; 1,1,1-trimethylol propane; 2-methyl 2,4-pentanediol; 2,2-dimethyl-1,3-dihydroxy pentane; polyethylene glycol (mol. wt.=400); butyne-1,4-diol; polypropylene glycol (avg. mol wt.=400); polyglycol 15-200; p-xylene α,α-diol; and polyepichlorohydrin.

9. The method of claim 2 in which said polyhydroxy compound is 1,2-propylene glycol.

10. The method of claim 2 in which said polyhydroxy compound is trimethylolpropane.

11. The method of claim 2 in which the polyhydroxy compound is 1,3-butanediol.

12. An aerosol formulation comprising a non-toxic dermatologically acceptable non-aqueous solvent, an aerosol propellant and at least 5% by weight of an inorganic-organic coordinated complex of aluminum formed by the method of claim 1.

13. An aerosol formulation comprising a non-toxic dermatologically acceptable non-aqueous solvent, an aerosol propellant and at least 5% by weight of an inorganic-organic coordinated complex of aluminum formed by the method of claim 2.

14. An aerosol formulation comprising a non-toxic dermatologically acceptable non-aqueous solvent, an aerosol propellant and at least 5% by weight of an inorganic-organic coordinated complex of aluminum formed by the method of claim 9.

15. An aerosol formulation comprising a non-toxic dermatologically acceptable non-aqueous solvent, an aerosol propellant and at least 5% by weight of an inorganic-organic coordinated complex of aluminum formed by the method of claim 7.

16. The method of claim 2 in which the polyhydroxy compound is 1,2 propylene glycol, and the aqueous solution of the $Al_2(OH)_5Cl$ and 1,2 propylene glycol is reacted in a proportional ratio so that the resulting product after spray drying the mixture at a temperature of between 80° C. and 320° C. has the formula:

$$Al_2(H_2O)_{0.7-1.1}(OH)_{4.9-5.1}(Cl)_{0.9-1.1}$$
$$(1,2 \text{ propylene glycol})_{0.7-1.3}$$

References Cited

UNITED STATES PATENTS 3,359,169  12/1967  Slater.

HELEN M. McCARTHY, *Primary Examiner.*

H. M. S. SNEED, *Assistant Examiner.*

U.S. Cl. X.R.

260—448; 424—68, 343, 346